US010436276B2

(12) United States Patent
Patzenhauer et al.

(10) Patent No.: US 10,436,276 B2
(45) Date of Patent: Oct. 8, 2019

(54) DAMPING VALVE

(71) Applicant: ZF Friedrichshafen AG

(72) Inventors: Andre Patzenhauer, Eitorf (DE);
Johannes Weber, Ruppichteroth (DE);
Frank Wagenknecht, Eitorf (DE);
Klaus Schmitz, Eitorf (DE); Peter
Kirschbaum, Asbach (DE)

(73) Assignee: ZF Friedrichshafen AG,
Friedrichshafen (DE)

( * ) Notice: Subject to any disclaimer, the term of this
patent is extended or adjusted under 35
U.S.C. 154(b) by 0 days.

(21) Appl. No.: 15/738,237

(22) PCT Filed: Apr. 18, 2016

(86) PCT No.: PCT/EP2016/058474
§ 371 (c)(1),
(2) Date: Dec. 20, 2017

(87) PCT Pub. No.: WO2017/005383
PCT Pub. Date: Jan. 12, 2017

(65) Prior Publication Data
US 2018/0172106 A1 Jun. 21, 2018

(30) Foreign Application Priority Data

Jul. 3, 2015 (DE) .................... 10 2015 212 535

(51) Int. Cl.
F16F 9/34 (2006.01)
F16F 9/348 (2006.01)
F16F 9/46 (2006.01)

(52) U.S. Cl.
CPC .......... *F16F 9/3405* (2013.01); *F16F 9/3484*
(2013.01); *F16F 9/465* (2013.01); *F16F
9/3485* (2013.01)

(58) Field of Classification Search
CPC ...... F16F 9/3405; F16F 9/3484; F16F 9/3485;
F16F 9/465
USPC ..................................... 188/322.15
See application file for complete search history.

(56) References Cited

U.S. PATENT DOCUMENTS 2,941,629 A 6/1960 Rohacs
4,401,196 A 8/1983 Grundei
5,967,268 A * 10/1999 de Molina ............... F16F 9/52
188/266.5

(Continued)

FOREIGN PATENT DOCUMENTS

DE 1037209 8/1958
DE 3015596 10/1981

(Continued)

*Primary Examiner* — Thomas W Irvin
(74) *Attorney, Agent, or Firm* — Cozen O'Connor

(57) ABSTRACT

A damping valve includes a valve body with a stepped opening for receiving a preloading spring which acts on a tension rod at which is arranged a valve disk which at least partially closes a flow-out orifice of a flow channel which connects two opposite valve body sides to one another, and, in addition to the preloading spring force, a damping force which counteracts a swiveling movement of the valve disk acts on the tension rod. The additional damping force is formed by a displacer on the tension rod side. The display together with a portion of the stepped opening, forms a restrictor chamber.

11 Claims, 4 Drawing Sheets

(56) References Cited

U.S. PATENT DOCUMENTS

| | | | | |
|---|---|---|---|---|
| 6,182,805 B1* | 2/2001 | Kashiwagi | ............ | F16F 9/325 |
| | | | | 188/266.6 |
| 6,260,678 B1* | 7/2001 | Moradmand | ........... | F16F 9/348 |
| | | | | 188/315 |
| 6,302,248 B1* | 10/2001 | Nakadate | ................ | F16F 9/466 |
| | | | | 188/266.6 |
| 9,151,354 B2* | 10/2015 | Ewers | ..................... | F16F 9/464 |
| 2002/0189914 A1* | 12/2002 | Naples | .................. | F16F 9/3228 |
| | | | | 188/322.15 |
| 2004/0251099 A1* | 12/2004 | Papp | .................... | F16F 9/3214 |
| | | | | 188/322.15 |
| 2018/0156302 A1* | 6/2018 | Kus | ........................... | F16F 9/49 |
| 2018/0340588 A1* | 11/2018 | Chikamatsu | .............. | F16F 9/32 |

FOREIGN PATENT DOCUMENTS

| | | |
|---|---|---|
| DE | 3149378 | 9/1982 |
| DE | 102007017683 | 10/2008 |

\* cited by examiner

DAMPING VALVE

PRIORITY CLAIM

This is a U.S. national stage of application No. PCT/EP2016/058474, filed on Apr. 18, 2016. Priority is claimed on the following application: Country: Germany, Application No.: 10 2015 212 535.1, filed: Jul. 3, 2015; the content of which is/are incorporated herein by reference in its entirety.

FIELD OF THE INVENTION

The invention is directed to a damping valve having a valve body with a stepped opening for receiving a preloading spring which acts on a tension rod.

BACKGROUND OF THE INVENTION

FIG. 1 shows a detail from a known damping valve 1 of a vibration damper. A valve body 3 has a stepped opening 5 for receiving a preloading spring 7 which acts on a tension rod 9 at which a valve disk 11 is arranged.

At least one flow channel 13 which connects a flow-in orifice 15 at one valve body side 17 to a flow-out orifice 19 at an opposite valve body side 21 is connected paraxially to the stepped opening 5. The flow-out orifice 19 is at least partially closed by the aforementioned valve disk 11.

The stepped opening 5 adjoins a guide channel 23 for the tension rod 9. The guide channel 13 leads into the flow-out orifice 19. The diameter of the guide channel 23 is comparatively large such that the tension rod 9 can assume a certain inclined position. This inclined position ensures that a certain friction force acts on the tension rod 9 to prevent the tension rod 9 from swiveling during a lifting movement of the valve disk.

In principle, this constructional form has the advantage that the areas in which gas bubbles can form between the component parts, namely the preloading spring 7, are under a higher pressure than on the flow-out side 19. Therefore, gas inclusions in the damping medium have hardly any effect on the damping force.

There is known from U.S. Pat. No. 2,941,629 a hydraulic shock absorber in which a valve body is preloaded in a closing position by a spring force on the one hand and a damping force is applied against an opening movement of the valve body on the other hand. In all of the disclosed embodiments, the preloading spring acting on the valve body is arranged on the low-pressure side of the damping valve, i.e., the damping device is arranged on the flow-out side of the damping valve.

This construction suffers from the functional drawback that gas enclosed in the damping medium can outgas on the low-pressure side and can therefore reduce the damping action of the damping valve.

SUMMARY OF THE INVENTION

It is an object of the present invention to achieve a damping function of the valve body movement without friction force on the tension rod.

This object is met in that the additional damping force is formed by a displacer on the tension rod side which, together with a portion of the stepped opening, forms a restrictor chamber.

The proven concept of arranging the preloading spring on the compression side and using a tension rod can be retained.

The valve body is spatially separated from the displacer so that both component parts can be optimized for the specified function.

For purposes of a simple construction, the displacer is formed by a disk arrangement. A disk can be manufactured with extreme precision, e.g., by stamping, and accordingly leads to a precise annular gap cross section which, inter alia, determines the damping force.

A further option consists in that the disk arrangement forms a pressure relief valve. The disk valve can be configured, e.g., such that it opens at low temperatures and low viscosity of the damping medium in order to limit the damping force on the valve opening movement.

Optionally, the at least one flow channel can run outside of the stepped opening. A definite separation between the restrictor chamber and the valve function is achieved in this way.

In order to allow a freer configuration of the cross section of the outlet orifice, at least one flow channel runs at least partially obliquely with respect to the tension rod. For example, the cross section of the outlet orifice can be dimensioned smaller than a pitch circle diameter on which the flow channel is arranged.

It is also possible that the flow channel extends inside of a cross-sectional area of the stepped bore and is separated from the restrictor chamber by an annular wall. This embodiment can be produced in a particularly simple manner.

The annular wall is preferably formed by a sleeve. The machining cost for the valve body can be minimized in this way.

In a further advantageous configuration, a transfer sleeve is arranged between a supporting surface on the tension rod side and the displacer. this facilitates, for example, the preparation of a flow-in cross section in the flow channel and the displacement path transmission of the tension rod to the displacer.

Advantageously, the displacer is centered at the annular wall. Particularly when the annular wall is formed by a sleeve, the guide diameter can be produced with precision in an economical manner, e.g., by utilizing a semi-finished precision-tubular product.

It may be provided that a front face of the annular wall limits the displacement path of the tension rod such that the axial installation space for the preloading spring is longer than the solid length of the latter. This limits the loading of the preloading spring and affords greater freedom in the dimensioning of the preloading spring.

BRIEF DESCRIPTION OF THE DRAWINGS

The invention will be described more fully referring to the drawings, in which.

DETAILED DESCRIPTION OF THE PRESENTLY PREFERRED EMBODIMENTS

Figure 1:
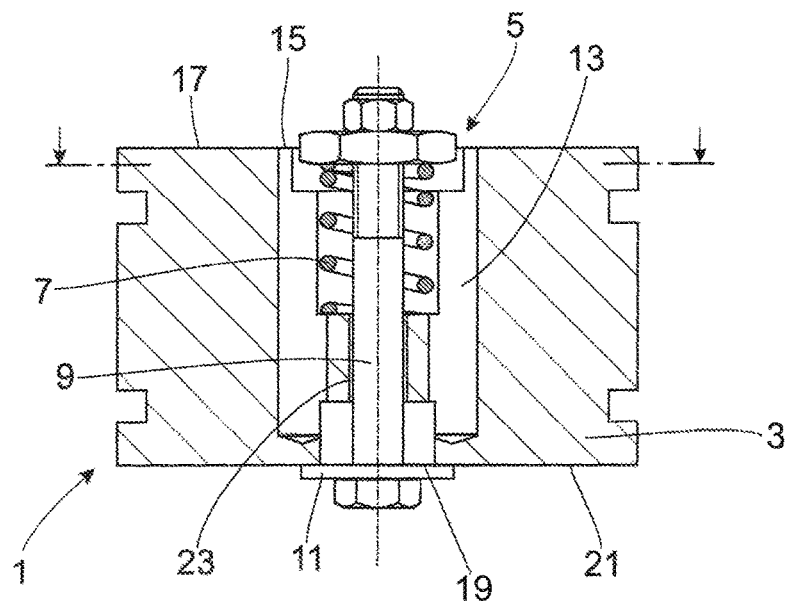
FIG. 1 shows a damping valve according to the prior art.
Figure 2:
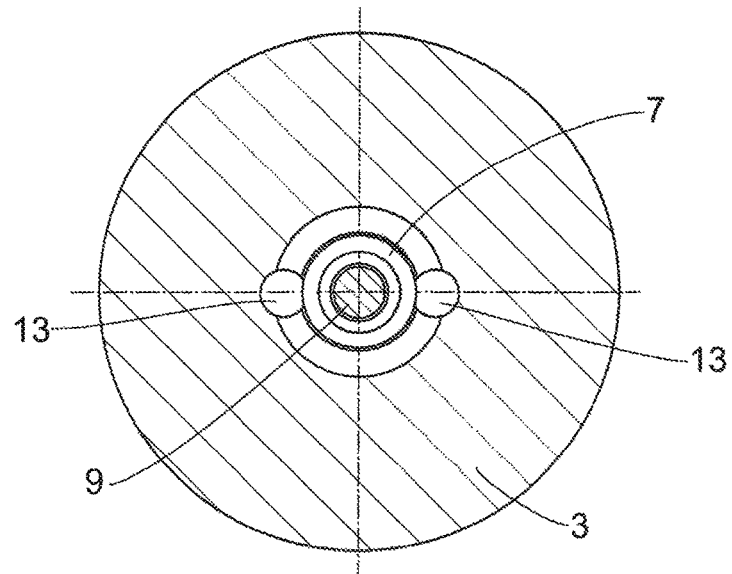
FIG. 2 shows a cross section through the damping valve according to FIG. 1.
Figure 3:
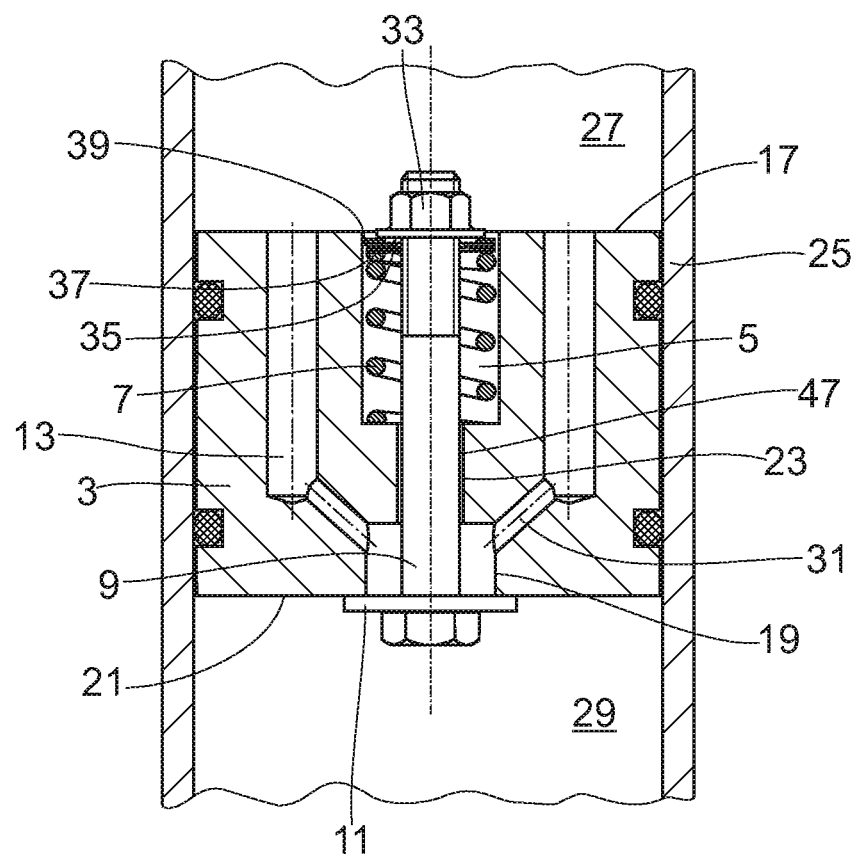
FIG. 3 shows a damping valve according to the present invention.

FIG. 3 shows the damping valve 1 according to the invention which is inserted into a cylinder 25 of a vibration damper. The damping valve 1 can be used, e.g., at an axially moveable piston rod or as stationary damping valve likewise between two working chambers 27; 29.

The simplest constructional form with a single through-flow direction is shown in FIG. 3. Of course, the damping valve 1 can also have a plurality of individual valves with opposed flow valve rods.

The damping valve 1 has the valve body with the stepped opening 5 for receiving the preloading spring 7 which acts on the tension rod 9. The tension rod 9 axially penetrates the valve body 3. The tension rod is radially positioned in the guide channel 23 as part of the stepped opening 5 and can execute an axial movement against the force of the preloading spring 7.

The valve disk 11 is arranged at the tension rod 9. "Arranged" can mean a floating bearing support or also, for example, a one-part construction of tension rod 9 and valve disk 11. This valve disk 11 at least partially closes the flow-out orifice 19 of the at least one flow channel 13 which connects the two opposite valve body sides 17; 21 to one another. FIG. 3 shows two flow channels 13 which run radially outside of the stepped opening 5. The two flow channels 13 have at least one portion 31 which extends at an inclination to the tension rod 9 and is connected to the flow-out orifice 19. It can also be provided that the flow channel 13 is constructed at an inclination to the tension rod 9 over its entire length.

Fastening means 33, e.g., a screw nut, are arranged at the tension rod 9, and a displacer 37 is held by the preloading spring 7 at the supporting surface 35 of the fastening means 33 that faces in the direction of the stepped opening 5.

Figure 4:
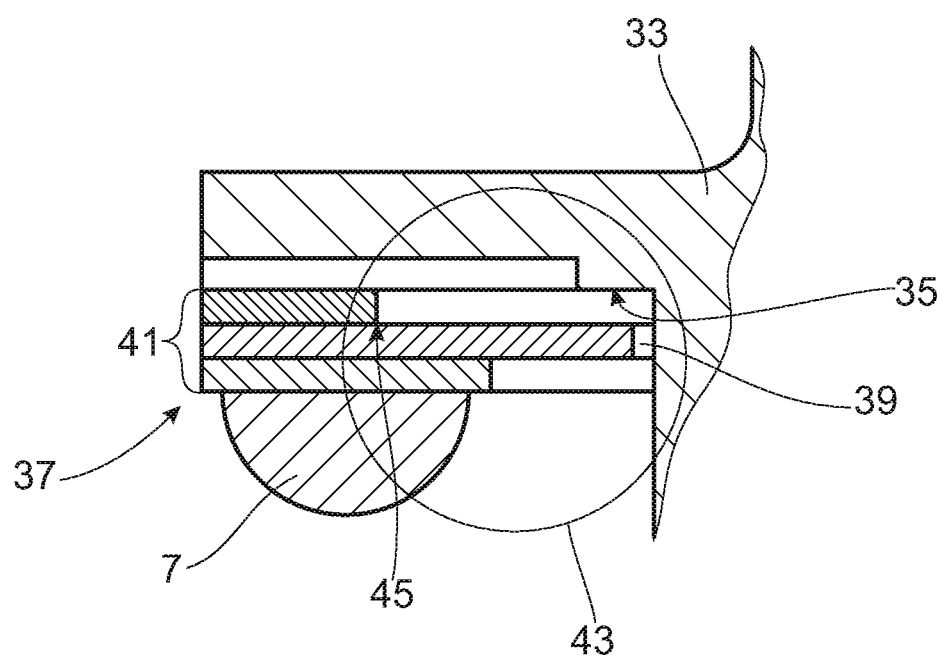
FIG. 4 is a detail referring to FIG. 3.

As is shown in FIG. 4, the outer diameter of the displacer 37 forms an annular gap 39 with respect to the inner wall of the stepped opening 5. Accordingly, the displacer 37 and the stepped opening 5 form a restrictor chamber when there is a movement of the displacer during an axial movement of the tension rod 9 and damping medium is pressed into the annular gap 39.

The displacer 37 is preferably formed by a disk arrangement 41. The disk arrangement can form a pressure relief valve 43, e.g., in that it carries out a lifting movement around a tipping point and is accordingly hydraulically connected in parallel with the annular gap 39.

During an oncoming flow proceeding from a working chamber 27, the damping medium flows via the at least one flow channel 13 in direction of the flow-out orifice 19 and exerts a lifting force on the valve disk 11. This lifting force acts as tensile force on the tension rod 9 which is preloaded by the preloading spring 7 in closing direction of the valve disk 11.

During a lifting movement, the displacer 37 or disk arrangement 41 is moved into the restrictor chamber. The annular gap 39 between the disk arrangement 41 and the inner wall of the restrictor chamber is larger than a guide gap 47 between the tension rod 9 and the guide channel 23. Consequently, the damping medium is displaced from the restrictor chamber in direction of working chamber 27. If the damping medium should have a low viscosity, the pressure relief valve 43 can open.

Both the lifting and the closing movement are subject to the displacer function and, therefore, a hydraulic counterforce so that a swiveling movement of the valve disk 11 is ruled out.

Figure 5:
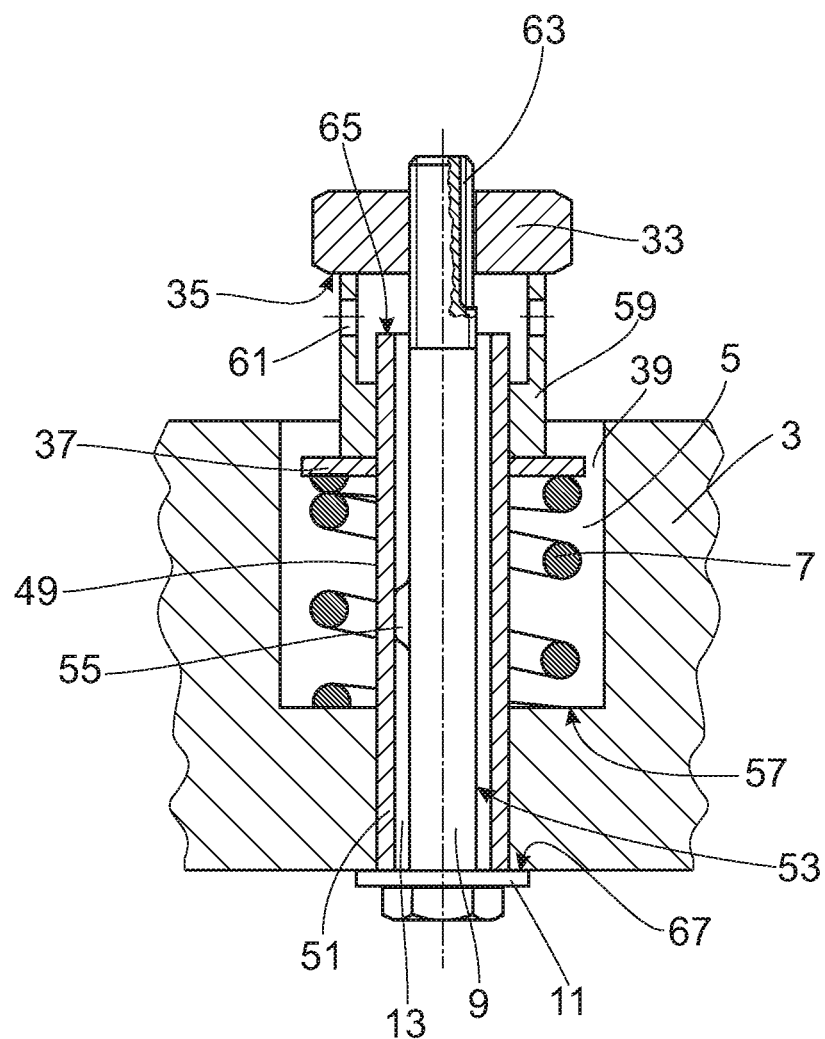
FIG. 5 shows an alternative embodiment.

FIG. 5 describes an alternative embodiment which functions identically and in which the at least one flow channel 13 extends within a cross-sectional area of the stepped opening 5 and is separated from the restrictor chamber by an annular wall 49. The annular space between the annular wall 49 and the stepped opening 5 forms the restrictor chamber. For example, the annular wall is formed by a separate sleeve 51 which is pressed into the valve body 3. The flow channel 13 is formed by the inner wall of the annular wall 49 and a lateral surface 53 of the tension rod 9. If necessary, the tension rod can have radial guide cams 55 which slide at the inner wall of the sleeve 51 but nevertheless allow a damping medium flow to pass.

As in FIG. 3, the preloading spring 7 is supported on a base 57 of the stepped opening and preloads the displacer 37 against the supporting surface 35 of the tension rod 9 via a transfer sleeve 59. Supporting surface 35 is also formed by fastener 33 in this instance.

The transfer sleeve 59 has at least one inlet orifice 61 in direction of the flow channel 13. Alternatively, the tension rod can have, e.g., in the thread region for the fastener, at least one axial channel 63 which provides a permanent inlet cross section.

The displacer 37 is centered at the annular wall 49 and sleeve 51. The displacer 37 and the transfer sleeve 59 can be constructed as one part. In this way, the risk of an inclined position of the displacer 37 due to the longer guide length at the annular wall 49 can be minimized.

The tension rod 9 is always longer than the annular wall 49. An end front face 65 of the annular wall 49 limits the displacement path of the tension rod 9 and, therefore, also the lifting path of the valve disk 11 from a valve seat surface 67. The axial installation space for the preloading spring 7 inside the restrictor chamber is longer than the solid length of the preloading spring 7.

In this constructional form, the displacer can also have a pressure relief valve as was described with reference to FIG. 3.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A damping valve comprising:
a valve body having opposite valve body sides, a stepped opening and at least one flow channel having a flow-out orifice and interconnecting said opposite valve body sides;
a preloading spring disposed within said stepped opening acting on said tension rod with a preloading spring force;
a tension rod extending through said valve body and adapted to execute an axial movement against the force of the preloading spring;
a valve disk arranged on said tension rod at least partially closing said flow-out orifice; and
a displacer mounted on said tension rod and constructed to form an additional damping force on the tension rod and forming a restrictor chamber together with said stepped opening, said damping force counteracting a swiveling movement of said valve disk on said tension rod.

2. The damping valve according to claim 1, wherein said displacer is formed by a disk arrangement.

3. The damping valve according to claim 2, wherein said disk arrangement forms a pressure relief valve.

4. The damping valve according to claim 1, wherein said at least one flow channel runs outside of said stepped opening.

5. The damping valve according to claim 4, wherein said at least one flow channel runs at least partially obliquely with respect to said tension rod.

6. The damping valve according to claim 1, wherein said flow channel extends inside of a cross-sectional area of said stepped opening and is separated from said restrictor chamber by an annular wall.

7. The damping valve according to claim 6, wherein said annular wall is formed by a sleeve.

8. The damping valve according to claim 7, wherein said displacer is centered at said annular wall.

9. The damping valve according to claim 7, wherein said preloading spring has a solid length and said tension rod moves along a displacement path and wherein a front face of said annular wall limits said displacement path of said tension rod such that an axial installation space for said preloading spring is longer than said solid length of said preloading spring.

10. The damping valve according to claim 1, additionally comprising a transfer sleeve arranged between a supporting surface on said tension rod side and said displacer.

11. The damping valve according to claim 1, wherein said tension rod is radially positioned in a guide channel; the displacer and an inner wall of the restrictor chamber forming an annular gap therebetween and wherein said annular gap between the inner wall of the restrictor chamber and the displacer is larger than a guide gap between said tension rod and said guide channel.

* * * * *